United States Patent [19]

Kennedy

[11] 4,026,710

[45] May 31, 1977

[54] PREPARATION OF ZINC FLAKE COATING COMPOSITION

[75] Inventor: Alexander W. Kennedy, Chardon, Ohio

[73] Assignee: Diamond Shamrock Corporation, Cleveland, Ohio

[22] Filed: Jan. 27, 1975

[21] Appl. No.: 544,057

[52] U.S. Cl. .................................. 106/1; 106/14; 148/6.2; 427/436
[51] Int. Cl.² .......................................... C09D 5/10
[58] Field of Search ............... 148/6.2; 106/1, 14; 427/201, 205, 192; 252/389 R, 396

[56] References Cited

UNITED STATES PATENTS

| | | | |
|---|---|---|---|
| 1,954,462 | 4/1934 | Tainton | 106/290 |
| 2,312,088 | 2/1943 | Fleming | 106/243 |
| 2,432,465 | 12/1947 | Babcock | 106/290 |
| 3,671,331 | 6/1972 | Malkin et al. | 148/6.2 |
| 3,717,509 | 2/1973 | Palm et al. | 148/6.2 |
| 3,907,608 | 9/1975 | Barrett et al. | 148/6.2 |

*Primary Examiner*—Lorenzo B. Hayes
*Attorney, Agent, or Firm*—John J. Freer

[57] ABSTRACT

A coating composition for application to a metal substrate can desirably contain $CrO_3$ and zinc flake in aqueous medium, as well as containing organic liquid. Such compositions will provide a corrosion and alkali resistant coating to the metal. The zinc flake can be mechanically flattened from non-flake starting material, in a liquid medium that includes organic liquid for the coating composition. Efficiency of compositional preparation initiating with flake preparation is thereby achieved.

7 Claims, No Drawings

PREPARATION OF ZINC FLAKE COATING COMPOSITION

BACKGROUND OF THE INVENTION

Chromic acid and pulverulent metal in a liquid medium have heretofore been applied to metal substrates followed by baking to attain a corrosion-resistant coating, such as disclosed in U.S. Pat. No. 3,687,738. Such compositions further containing organic substance and with zinc flake being representative of useful pulverulent metal have been shown in U.S. pending application Ser. No. 370,437, now U.S. Pat. No. 3,907,608.

Heretofore, the flake has been prepared without regard to coating composition needs. Hence, the commercially available flake concentrates have not been suitable for direct incorporation in the chromic-acid-containing coating compositions. Thus normal filtration operations subsequent to the flaking process, and drying to remove the incompatable organics, have been employed. Then, in coating composition preparation, fresh, compatible organic substance is needed for supplying the needed organic liquid to the composition.

SUMMARY OF THE INVENTION

It has now been found that special organic liquid can be used as at least a portion of the zinc flaking medium and that, furthermore, such liquid will be useful in the coating composition. Hence composition preparation is initiated with flake manufacture. Because of this, further economy is achieved since filtration and drying that normally follows flake preparation can be obviated. Moreover, efficiency in subsequent coating composition preparation is now obtained without sacrifice of desirable coating characteristics for coatings from such compositions.

Broadly, the present invention is directed to a process for making a zinc flake and hexavalent chrome-containing coating composition, which composition can provide an adherent and corrosion-resistant coating on a metal substrate, and wherein the medium of this coating composition is supplied by water plus organic substance. The process comprises combining finely divided zinc metal having non-flaked zinc particles with a medium containing organic substance, with the flaking medium organic substance being present in an amount sufficient to provide a weight ratio of zinc metal to such substance of between about 3:1 and 1:3; further, the substance is selected from the group consisting of diacetone alcohol, 2-ethoxyethanol and 2-butoxyethanol. The process also comprises mechanically flattening and polishing the zinc particles while contained in such medium, thereby preparing a dispersion of flaked metal particles in the medium.

Next the process calls for admixing the zinc flake dispersion with additional coating composition ingredients including hexavalent-chromium-containing substance and water, with there being sufficient zinc flake and organic substance in the coating composition whereby it contains: (1) between about 50 and about 500 grams per liter of the metal particles; and (2) above 15 but below about 50 volume percent of organic substance, basis the total volume of the composition liquid medium; and there being sufficient of the hexavalent-chromium-containing substance to supply the composition with a weight ratio of chromium, expressed as $CrO_3$, to the metal particles of between about 1:1 and 1:15. Lastly, the process comprises mixing and blending the ingredients thereby preparing such zinc flake and hexavalent chromium-containing coating composition.

DESCRIPTION OF THE PREFERRED EMBODIMENTS

Other than the liquid supplied to the medium for the preparation of the zinc flake, there will be supplied finely divided metallic zinc, such as zinc dust. The dust most always used will have all particles more finely divided than 100 U.S. Mesh, although screening can be employed after flake preparation. The finely-divided zinc is generally charged to a ball mill for the grinding and polishing, i.e., the flaking operation, with a typical procedure having been described for example in U.S. Pat. No. 1,954,462. As is also disclosed therein, the charge to the mill will most likely include very minor amounts, e.g., on the order of 1 weight percent of the charge, of agents including organic acids such as stearic and oleic acid. It is critical that the flaking medium include either diacetone alcohol, 2-ethoxyethanol or 2-butoxyethanol. These are the substitutents that have been found to be useful in the grinding medium, and which further can supply a portion of the medium for the subsequently prepared coating composition.

Such organic substances, together with any of the above-mentioned organic acids, are typically present in the charge to the flaking mill so as to provide a weight ratio of the finely divided zinc to the organic substance of the charge at between 3:1 and 1:3. A greater proportion of zinc than about 3:1 can provide inefficient flattening and polishing during flake production. A lesser proportion of the zinc than 1:3 can lead to uneconomically extended production times. In addition to the charge, the mill will include the impact material, typically iron shot. These impact media may be spheres, although other configurations are contemplated, and most often will have size such that the diameter of individual spheres are between one-fourth inch to three-fourths inch. The amount of impact media present in the mill, in relation to the amount of dust to be flattened, is well known in the art. Usually for a metal such as zinc the amount of impact media to the amount of zinc dust to be flattened will be between about 20:1 to 0.5:1, with a weight ratio within the range of from 10:1 to 2:1 being more typical.

In addition to the above-mentioned ingredients, the mill will generally be supplied with a very minor amount of weldment inhibitor. Such inhibitors prevent the adhesion, or weldment, of flakes one to the other or to the impact media during the flaking operation. Small amounts of aluminum metal, to prevent welding of flakes, has been taught in U.S. Pat. No. 2,432,465. Other suitable inhibitors are known, including organic materials that are strong nitrogenous bases. Typically only a very minor amount, on the order of 1 or 2 weight percent for the aluminum, or of even one-fourth weight percent or less for the organic substances, basis weight of the metal powder, may be used.

In addition to substances mentioned hereinabove, other ingredients that may be included in the charge for the flaking operation include grinding agents such as silicon carbide and alumina that can assist in reducing the particle size of the flake product. Other ingredients typically useful in such grinding medium are also contemplated, although they provide only a very minor amount of the total charge. After the flaking operation, the dispersion containing the flaked zinc metal may be concentrated. Typical severe concentration to concentrate dryness is however obviated by the present invention. Prior to concentration, the charge may be classified, e.g., screened, to enhance zinc flake product uniformity. Concentrating can be accomplished by any manner typical in the art, such as press filtration. However, for efficiency and ease of handling, concentration will retain above about 10 percent, basis weight of the concentrated product, of the diacetone alcohol, 2-ethoxyethanol or the 2-butoxyethanol in such product. Preferably, for enhanced efficiency and economy, such organic substance will be present in the concentrated product in an amount of about 20 weight percent or greater. In any event, such product as then prepared, is ready for use, or can be shipped and/or stored for subsequent use.

In use, the prepared zinc flake dispersion will be mixed with additional coating composition ingredients, including hexavalent-chromium-containing substance and water. The substance providing the hexavalent-chromium is typically chromic acid or its equivalent in aqueous medium, for example, chromium trioxide or chromic acid anhydride. Additionally, or as a portion of the substance, a salt may be used. Such salts most typically are the calcium, barium, magnesium, zinc, cadmium, and strontium dichromates. Although the coating composition might contain only a small amount, e.g., 5 grams per liter of hexavalent chromium, expressed as $CrO_3$, and may contain as much as about 100 grams per liter of hexavalent chromium, expressed as $CrO_3$, it will typically contain between about 20–80 grams.

For supplying the liquid medium, without considering the contribution by the organic substance, water virtually always supplies the whole amount. Other liquids may possibly be used, but preferably only a very minor amount of the aqueous medium, basis an organic-substance-free medium, is such other liquid material. Such other liquids that might be contemplated include alcohols, most notably t-butanol, and halogenated hydrocarbon liquid, some of which have been discussed in U.S. Pat. Nos. 2,762,732 and 3,437,531.

A substantial amount of liquid in the coating composition liquid medium, i.e., up to 50 volume percent based on the total volume of such liquid medium, can be supplied by the organic substance. Such organic substance will also supply substantially above 15 volume percent, on a similar basis, of such total liquid and advantageously for enhanced coating characteristics, supplies above about 20 volume percent. Lesser amounts will not contribute sufficient substance to assure consistently augmented properties of the coating, although such amounts might achieve enhanced dispersion and compositional flow characteristics. It is most important that the organic substance be liquid at 100° C., and by such herein it is meant to be liquid at 100° C. at atmospheric pressure.

When additional organic substance is used in the coating composition along with the flaking medium organic substance, such additional can be supplied by simply adding more of the same substance of the flaking medium. Or such additional organic substance can be other organic liquid so long as the liquid will be liquid at the water boiling point. The liquid should also be easily soluble in water, and must not be highly toxic to avoid uneconomical expense in handling and use. These criteria, along with those discussed hereinbelow, provide for the compatibility, as such term is used herein, of the organic liquid in the coating composition. The other criteria for compatibility include participation of the liquid in the formation of a coating. This participation is best exemplified by such characteristics as most desirable leafing into a layered, substantially uniform coating of the metallic zinc flake as well as characteristics of the resultant coating, for example as exhibited by mild alkali resistance.

The organic liquids that contain carbon, oxygen and hydrogen and have at least one oxygen-containing constituent that may be hydroxyl, or oxo, or a low molecular weight ether group, i.e., a $C_1$–$C_4$ ether group, are often suitable. Since water solubility is sought, polymeric hydrocarbons are not particularly suitable and advantageously serviceable substances contain less than about 15 carbon atoms. Particular liquids which can or have been used as additional substance include tri-, and tetraethylene glycol, di- and tripropylene glycol, the monomethyl, dimethy, and ethyl ethers of these glycols, the low molecular weight ethers of diethylene glycol, and mixtures of the foregoing. It will be appreciated that because of their limited water solubility, it is not meant to include herein either the hexyl or dibutyl ethers of diethylene glycol.

The zinc flake dispersion is used in preparing the coating composition so as to provide an amount of metal flake not substantially above about 500 grams of metal per liter of coating composition liquid medium. The presence of greater than about 500 grams per liter of metal flake can contribute to an undesirable viscosity effect for the coating composition. Preferably for efficient composition preparation, all of the zinc flake is supplied by the zinc flake dispersion, although a portion of such flake can be otherwise provided, as for example for the more concentrated amounts of zinc flake in the coating composition. Advantageously, for economy and desirable coating characteristic, the composition contains at a minimum about 50 grams of metal flake per liter and preferably contains between about 150–400 grams of metal per liter. It is to be understood that in making the coating composition, a portion of the total metal flake may be other than zinc, for example, a minor amount of the flake may be aluminum flake. This flake, also sometimes termed leafing aluminum pigment has been discussed, for example in U.S. Pat. No. 2,312,088. The total of the flake may be blended with pulverulent metal powder, but typically with only very minor amounts of powder, and such powder should have particle size so that all particles pass 100 mesh and a major amount pass 325 mesh. Preferably the composition is virtually to completely free of metal powder.

The coating composition should have a weight ratio of chromium, expressed as $CrO_3$, to metal flake of between about 1:1 to 1:15. A ratio of beyond about 1:15 may not provide sufficient chromium in the coating to achieve augmented bonding of the metal flake to the metal substrate. A ratio of about 1:1 may be achieved, but should preferably be at metal concentrations of less than about 100 grams per liter. As the metal content approaches about 500 grams per liter and thus the chromium content can approach about 100 grams per liter the upper weight ratio of chromium, expressed as $CrO_3$, to metal flake approaches 1:5. These coating compositions are virtually always made as very concentrated coating compositions at a ratio of between about 1:4 and 1:9 and have particular utility in the coating of small parts.

Such coating compositions may be applied to the metal substrate by any conventional method for coating a substrate with a liquid, for example, dip coating, roller coating or reverse roller coating, or combinations of techniques as, for example, spray and brush techniques. Typically the composition is applied by simply dipping the article into the composition. The metal surface can be a preheated metal surface to assist in the curing of the composition, or the coating composition may be applied from a heated bath.

The coating composition should contain some, and generally contains up to, for example, about 0.05 volume percent, basis total composition liquid, and typically not above about 1–2 volume percent, of a dispersing agent. Such agent may be present in as little as 0.0005 volume percent, also on a total liquid basis. It is generally contemplated to employ a dispersing agent that is a nonionic surfactant which may be an ethoxylated alkylphenol such as a nonyl or octyl phenol. It is also contemplated to employ the nonionic ethoxylated aliphatic alcohols, representatives of which include the oleyl, lauryl, and stearyl alcohols. Other suitable nonionic surfactants that are also readily commercially available and are contemplated for use include, for example, carboxylic esters that encompass the glycerol esters and the anhydrosorbitol esters, as well as the poloxyethylene esters of fatty, rosin, and tall oil acids.

The resulting coating weights on the metal substrate may vary to a considerable degree but, exclusive of the metal flake the coating will most typically always be present in an amount supplying above about 5 milligrams per square foot of chromium, expressed as chromium and not $CrO_3$. Furthermore, coatings containing below about 15 milligrams per square foot of chromium, expressed as chromium and not $CrO_3$, should be topcoated to impart significant enhancement in corrosion resistance of the coated substrate. Also if the coated metal substrate is to be subsequently formed, the coating should contain not substantially above about 200 milligrams per square foot of chromium as the coating may be subjected to cracking or crazing during forming operation, although for typically finished products when subsequent forming is not contemplated, and extended corrosion resistance without topcoating may be desirable, such may contain up to about 500 milligrams per square foot of chromium.

A subsequent paint topcoating is also a consideration for the amount of metal flake that should be present on the surface of the substrate in the coating. Such coatings containing about 10–200 milligrams per square foot of metal flake are virtually always topcoated. However, subsequently topcoated residues can contain substantially more metal flake, e.g., 600–700 milligrams per square foot of such metal, and the substrate may contain up to about 5,000 milligrams per square foot of metal flake, whereas an excess of that amount is usually uneconomical.

The coatings have an excess of metal flake to chromium, even at the lesser concentrations of the metal. Generally, the coating should have a weight ratio of chromium, expressed as chromium and not $CrO_3$, to zinc metal flake of less than about 0.5:1, and such ratio is most usually for the less heavy coating weights, since as the coating weights approach, for example, 5,000 milligrams per square foot of metal, the weight ratio of chromium to zinc metal flake will be less than about 0.2:1. It has also been found that for coating small parts, e.g., parts adapted for individual dipping in a coating bath, which can be final products that will not be normally subjected to subsequent forming, and where coating weights may approach 5,000 milligrams per square foot of metal, the weight ratio of chromium to zinc flake in the coating may be as low as about 0.02:1.

Other compounds may be present in the coating compositions but, even in combination, are typically present in minor amounts. Thus, such compositions are often resin-free and can be substantially pigment free, i.e., contain little, if any, pigment or resin such as 10 grams per liter total of both or less. It may however be desirable to include substances that can thicken the coating composition, e.g., water soluble cellulose ethers such as hydroxyethylcellulose. Other such agents include xanthan gum hydrophilic colloids, as well as additional gums, e.g., guar gum and karaya gum. Also, since the adherence for the particulate metal to the metal substrate is achieved by the chromium-providing-substance ostensibly through the interaction of such substance with the organic substance during baking, such coating compositions need not contain resin, and such coatings that will be subsequently topcoated are virtually always pigment-free, exclusive of the pulverulent metal.

These other compounds further include inorganic salts and acids as well as organic substances, often typically employed in the metal coating art for imparting some corrosion resistance or enhancement in corrosion resistance for metal surfaces. Such materials include zinc chloride, magnesium chloride, various chromates, e.g., strontium chromate, molybdates, glutamic acid, succinic acid, zinc nitrate, and succinimide and these are all preferably avoided, but if present, are most usually employed in the liquid composition in a total maximum amount of less than 10 grams per liter.

For curing applied coating composition the preferred temperature for the subsequent heating, which may be preceded by drying such as air drying, is within the range from about 400° F. but more typically from about 450° F. at a pressure of 760 mm. Hg up to not essentially above about 1,000° F. Such an elevated substrate temperature may be attained by preheating the metal prior to application of the coating composition. However, such curing temperatures do not often exceed a temperature within the range of about 450°–700° F. At the elevated curing temperatures the heating can be carried out in as rapidly as about 1 second or less but is often conducted for several minutes at a reduced temperature.

Before coating it is, in most cases, advisable to remove foreign matter from the metal surface by thoroughly cleaning and de-greasing. De-greasing may be accomplished with known agents, for instance, with agents containing sodium metasilicate, caustic soda, carbon tetrachloride, trichlorethylene, and the like. Commercial alkaline cleaning compositions which combine washing and mild abrasive treatments can be employed for cleaning, e.g., an aqueous trisodium phosphate-sodium hydroxide cleaning solution. In addition to cleaning, the substrate may undergo cleaning plus etching.

After heating, the resulting coated substrate can be further topcoated with any suitable paint, i.e., a paint, primer, including electrocoating primers, and weldable primers such as the zinc-rich primers that can be applied before, typically, electrical resistance welding, and paints such as enamel, varnish, or lacquer. Since the coated metal surfaces can exhibit a desirable upgrading in topcoat adhesion when compared, for example, to the uncoated substrate metal, paints are often applied over such coated substrates. Such paints may contain pigment in a binder or can be unpigmented, e.g., generally cellulose laquers, rosin varnishes, and oleoresinous varnishes, as for example tung oil varnish. The paints can be solvent reduced or they may be water reduced, e.g., latex or water-soluble resins, including modified or soluble alkyds, or the paints can have reactive solvents such as in the polyesters or polyurethanes. Additional suitable paints which can be used include oil paints, including phenolic resin paints, solvent-reduced alkyds, epoxys, acrylics, vinyl, including polyvinyl butyral and oil-wax-type coatings such as linseed oil-paraffin wax paints. The paints may be applied as mill finishes.

By way of specific illustration, 800 grams of finely-divided zinc dust having an average particle size of about 5-6 microns, together with 16 grams of stearic acid and 700 milliliters (mls.) of diacetone alcohol were charged to a 0.3 gallon porcelain mill jar. Also in the jar was about 0.5 pound of ½ inch cylindrical porcelain grinding media. At 90 r.p.m. the mill was operated for about 18 hours. After milling and on opening the jar, no gassing or pressure release was noted.

The fluid decanted from the jar was seen to be very uniform on visual inspection. After filtration of this fluid, 554 grams of the resulting wet cake along with 3 grams of non-ionic dispersing agent, 50 grams of chromic acid and 19 grams of zinc oxide were all blended together with sufficient deionized water to make one liter. The 554 grams of the wet cake contain sufficient diacetone alcohol for this substituent to contribute 20 volume percent of alcohol to the liter of coating composition. Upon visual inspection, the resulting coating composition was judged to be suitable for preparing desirable, corrosion-resistant coatings on metal substrates.

An additional wet paste, similar to the above-described wet cake, and prepared by the mechanical flattening and polishing of finely-divided zinc particles, contained after filtration about 81 weight percent zinc flake, 1 percent stearic acid and about 18 percent diacetone alcohol. Sufficient of this wet paste to supply 164 grams of zinc flake was then admixed with the following: 25 grams of chromic acid, 338 mls. water and 3 grams of hydroxyethyl cellulose thickener which is a cream to white colored powder having a specific gravity of 1.38-1.40 at 20/20° C., an apparent density of 22-38 pounds/cu. ft., and with all particles passing through 80 U.S. Mesh. The resulting coating composition was visually observed to be an undesirable coating dispersion ostensibly owing to an unacceptably low content of organic substance.

In an additional production run, a milled paste, containing desirable flaked zinc, is prepared to contain, after press filtration, 11 weight percent 2-butoxyethanol, 1 weight percent stearic acid, and 88 percent of zinc flake. Next, to 160 grams of this paste, including the 11 weight percent 2-butoxyethanol, there is added 50 grams of dipropylene glycol, 8 grams of non-ionic wetter, 4 grams of the above described hydroxyethyl cellulose, 40 grams of chromic acid, and 800 mls. of water. A 4 ×8 inch cold rolled steel panel, is coated in this composition by dipping therein and then permitting the panel to drain after removal. The panel has a total coating weight, after curing, of 1100 milligrams per square foot. Curing is achieved by placing the panel in an oven for 20 minutes, the oven being at a temperature of 570° F. The appearance of the faces of the cured panel, on visual inspection, is one of a smooth and uniform coating.

The panel is subjected to conical mandrel testing carried out by the procedure of ASTM D-522. Under such testing, and where a rating of 10 is given for complete film retention of a coating subjected to the test, the tested panel receives an exceptionally good rating of 9.5.

To an additional 320 grams of the above-described paste containing the 2-butoxyethanol, there was added 30 grams of aluminum flake, 210 grams of dipropylene glycol, 9 grams of non-ionic wetter, 3 grams of the above-described hydroxyethyl cellulose, 50 grams chromic acid, 4 grams zinc oxide and 730 mls. water. Small steel fastening clips were coated in a manner as described above. The clips had a total coating weight after curing of 1100 milligrams per square foot. Curing was achieved as described above.

A sample of these coated clips had a smooth and uniform appearance. In salt spray testing, according to the ASTM B-117-64 test, no red rust was observed in 500 hours of testing. Another sample of the coated clips were left exposed on an outdoor test rack, in the Northern Hemisphere, for a 5 month period from fall through mid-winter. After this test, no red rust was visually observed on the coated clips of this sample.

I claim:
1. A process for making a zinc flake and hexavalent chrome-containing coating composition for providing an adherent and corrosion-resistant coating on a metal substrate, wherein the medium of said coating composition is supplied by water plus organic substance, which process comprises:
   A. combining finely divided non-flaked zinc metal with a flaking medium liquid organic substance selected from the group consisting of diacetone alcohol, 2-ethoxyethanol and 2-butoxyethanol in an amount sufficient to provide a weight ratio of zinc metal to said substance of between about 3:1 and 1:3;
   B. mechanically flattening and polishing said zinc particles while contained in said medium, thereby preparing a dispersion of flaked metal particles in said medium;
   C. admixing the zinc flake dispersion with a hexavalent-chromium-containing substance and water in an amount sufficient to obtain a coating composition containing:
      1. between about 50 and about 500 grams per liter of flaked zinc particles; and
      2. above 15 but below about 50 volume percent of organic substance, basis the total volume of the composition liquid medium;
   and sufficient hexavalent-chromium-containing substance to supply said composition with a weight ratio of chromium, expressed as $CrO_3$, to flaked zinc particles of between about 1:1 and 1:15; and,
   D. mixing and blending said ingredients to obtain said zinc flake and hexavalent chromium-containing coating composition.

2. The process of claim 1 which further includes admixing an additional organic substance selected from the group consisting of additional said flaking medium liquid organic substance, tri-, and tetraethylene glycols, di-, and tripropylene glycol, the water soluble low molecular weight ethers of said glycols, the water soluble low molecular weight ethers of diethylene glycol, and mixtures thereof.

3. The process of claim 1 further characterized by separating a portion of the flaking medium organic substance from said dispersion of step (B) to form a concentrated zinc flake dispersion for admixing in step (C).

4. The process of claim 3 wherein said separation includes filtration, and said concentrated dispersion contains at least about 10 weight percent of said organic substance.

5. The process of claim 1 which further includes adding a leafing agent and weldment inhibitor to the flaking medium of step (A).

6. The process of claim 5 wherein said leafing agent is stearic acid.

7. The process of claim 5 wherein said weldment inhibitor is finely divided aluminum metal.

* * * * *